POLES

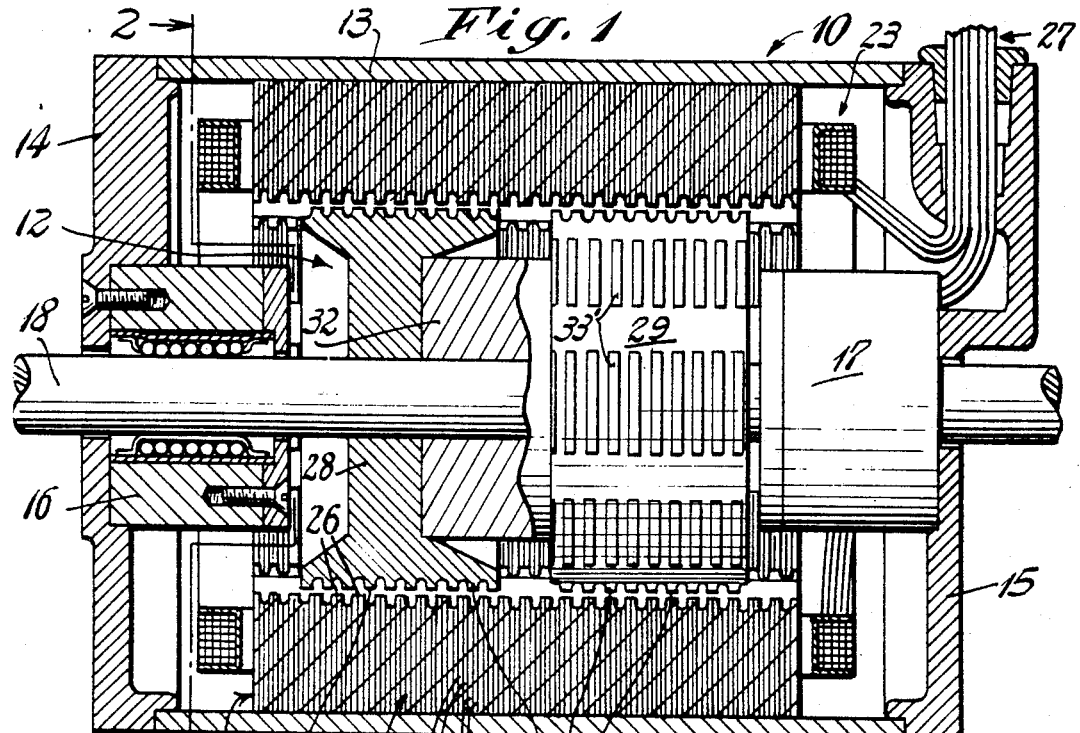
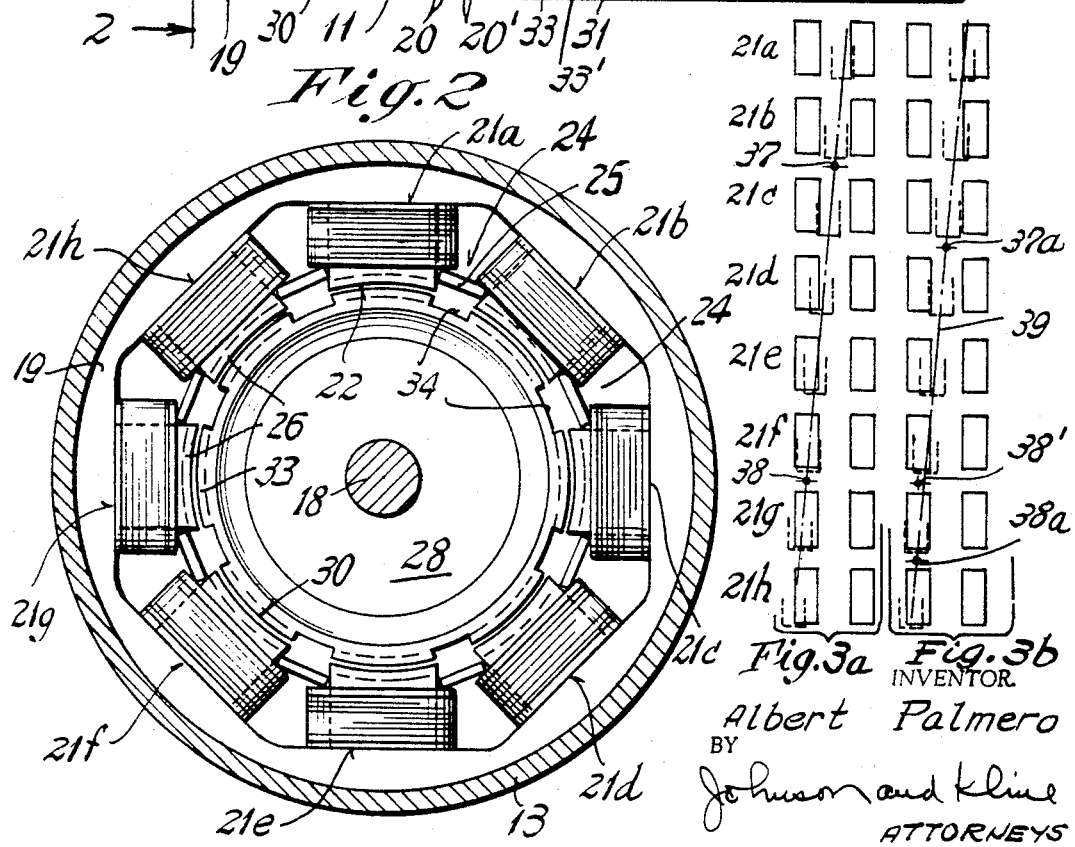

| | | 21a | 21b | 21c | 21d | 21e | 21f | 21g | 21h |
|---|---|---|---|---|---|---|---|---|---|
| | I | N | N | N | N | S | S | S | S |
| | II | S | N | N | N | N | S | S | S |
| | III | S | S | N | N | N | N | S | S |
| STEP | IV | S | S | S | N | N | N | N | S |
| | V | S | S | S | S | N | N | N | N |
| | VI | N | S | S | S | S | N | N | N |
| | VII | N | N | S | S | S | S | N | N |
| | VIII | N | N | N | S | S | S | S | N |
| | I | N | N | N | N | S | S | S | S |

INVENTOR.
Albert Palmero
BY
Johnson and Kline
ATTORNEYS

United States Patent Office 3,441,819
Patented Apr. 29, 1969

3,441,819
RECIPROCATING LINEAR MOTOR
Albert Palmero, Wallingford, Conn., assignor to The Superior Electric Company, Bristol, Conn., a corporation of Connecticut
Filed Apr. 18, 1966, Ser. No. 543,219
Int. Cl. H02p *3/02, 5/06, 7/06*
U.S. Cl. 318—115    4 Claims

ABSTRACT OF THE DISCLOSURE

An electric motor for producing small, discrete linear steps by the rotation of a rotor cooperating with a stator in which both the rotor and stator are formed with teeth with the teeth of one being in radial planes and the teeth of the other lying on a helical path and in which energization of the stator causes the rotor to move a finite rotational increment which includes a linear movement with the latter being a fraction of the tooth pitch.

---

In many instances it has been found desirable or necessary to move an object linearly from one position to another relatively rapidly and accurately. As the positions are generally desired to be varied, the movement is preferably one of discrete steps with there being a position coinciding with the junction between the steps. While reciprocating linear motors have heretofore been suggested for providing such movement, many have not been found completely satisfactory. One difficulty may be traceable to the steps being so large in length as to provide an insufficient number of positions within the total movement of the motor. Another difficulty is that in attempts to make the steps smaller a substantial loss of force has occurred. Furthermore, even with relatively small total movement, such as a few inches, it has been found difficult to construct such a motor that would maintain each of the steps of constant length within a small tolerance.

An object of the present invention is to provide an electric motor which produces linear motion in substantially small discrete steps of extremely constant length.

Another object of the present invention is to achieve the above object with a motor which rapidly produces each step with a relatively large force and which maintains itself effectively braked at each position.

A further object of the present invention is to provide a linear electric motor which is relatively simple in construction, composed of few moving parts and which is comparatively inexpensive to manufacture while being durable in use.

A feature of the present invention resides in providing an electric motor with a stator which is maintained fixed and a rotor that magnetically cooperates with the stator to effect linear reciprocating movement with respect to the stator. The stator is cylindrical and has a plurality of poles with the inner surface of the poles defining a substantially cylindrical surface. The rotor is mounted within this cylindrical surface and has at least one member which has a circular periphery closely mating with the cylindrical surface defined by the poles. The stator poles are energized in a selected sequence in order to provide definite magnetic polarities at each of the poles while the rotor is also magnetized. In the specific embodiment hereinafter described, a permanent magnet provides the rotor magnetization while the stator has winding means that includes a winding for each pole which provides, when energized, the magnetism of the pole.

To produce a linear movement for each change in magnetization of the poles, both the surfaces of the stator poles and the periphery of the rotor member are formed with teeth. One is formed with teeth which form radial planes perpendicular to the linear movement of the rotor while the other member is formed with teeth which lie in a helical path, similar to a worm. For each change in energization of the stator windings, the rotor is advanced a linear distance which is a fraction of the pitch of the teeth, such as the linear distance between the annular teeth of the one member or the axial pitch of the worm member. The fraction is dependent upon the number of poles and winding phases and in the instant embodiment hereinafter set forth there are eight poles and four winding phases and thus each change of energization will produce a linear movement of ⅛ of a tooth pitch. Accordingly even though the teeth may have a relatively large pitch, by reason of the rotor moving only a fraction thereof, the increment of movement is thus capable of being relatively small.

In the drawing:

FIGURE 1 is an axial section of the motor of the present invention.

FIGURE 2 is a sectional view taken on the line 2—2 of FIG. 1.

Figures 4, 5:
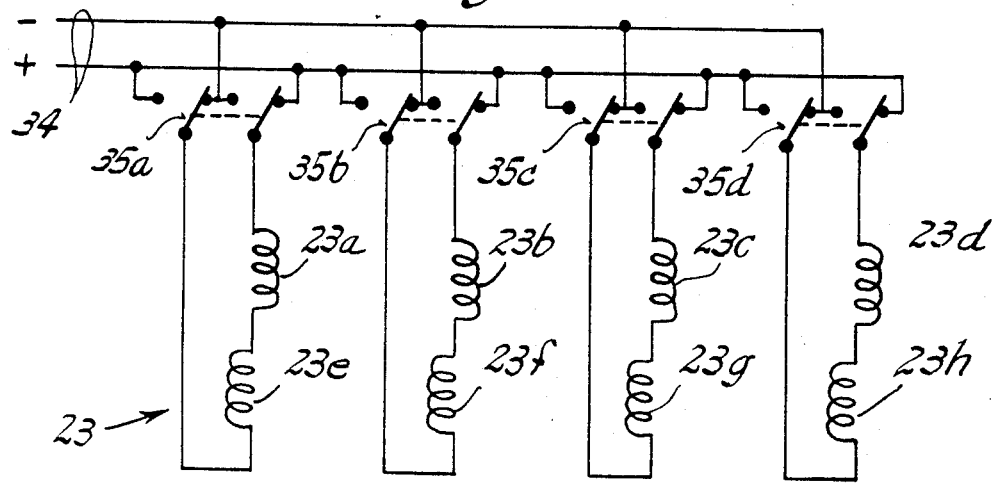

FIGS. 3*a* and 3*b* are planar diagrammatic representations of the relative positions of the teeth of the stator and rotor.

FIG. 4 is an electrical schematic diagram of the stator windings and the manner by which changes in energization may be effected.

FIG. 5 is a chart showing the sequence of magnetization of the poles for producing incremental steps.

Referring to the drawing, the reciprocating linear motor of the present invention is generally indicated by the reference numeral 10 and includes a stator and a rotor referred to generally as 11 and 12 respectively. The stator 11 includes a tubular casing 13 formed of magnetic metal to which are secured a front bell 14 and a rear bell 15. Each of the bells supports a ball bushing 16 and 17 respectively which in turn support a shaft 18 for linear movement. Secured on the inner periphery of the tubular casing is a pole forming member 19 consisting of a unitary stack of laminations 20 of thin magnetic sheet material. Each of the laminations 20 has substantially the shape shown in FIG. 2 and they form a plurality of poles 21*a* through 21*h*. Each of the poles has a portion that extends radially inwardly to have an inner periphery 22 that is arcuate. The peripheries 22 of all poles lie on a cylindrical surface having a center coinciding with the center of a shaft 18.

A winding means 23 includes windings 23*a* through 23*h* for the poles, with a winding having the same alphabetic reference character as the pole about which it is wound. Formed between the poles are slots 24 which enable the winding to be positioned about the poles and an insulating strip 25 is preferably employed to maintain the windings in place on the poles.

Referring to FIG. 1, the laminations 20 are substantially all identical except for alternate pairs of laminations 20′ which, though having an arcuate periphery, are reduced slightly in radial length to thereby form annular teeth 26 on the peripheries of the poles. The pitch of the teeth 26 is substantially constant and the teeth are perpendicular to the axis of the shaft 18. For energizing the winding means 23, wires, generally indicated by the reference numeral 27, may extend through the rear bell 15.

The shaft 18 of the rotor 12 has secured thereon a pair of members 28 and 29 formed of magnetizable metal with each being formed to have a cylindrical periphery 30 and 31 respectively. The members 28 and 29 are located concentrically on the shaft in spaced relation and secured therebetween is a permanent magnet 32 that is magnetized axially such that it magnetizes the member 28 to have an N polarity and the member 29 an S polarity.

The cylindrical peripheries 30 and 31 are formed with rotor teeth 33 and 33' respectively which have a tooth pitch that in the embodiment shown is substantially equal to the tooth pitch of the stator teeth 26. The teeth 33 are formed to lie on a helical surface having an axis that coincides with the axis of the shaft 18. Slots 34 limit the arcuate length of each of the teeth to substantially the arcuate length of the teeth 26 with the slots coinciding with slots 24 of the stator. There is thus formed by the eight slots 34, eight teeth corresponding in number to the number of poles of the stator. As the pitch of the teeth 33 is the length from a part of one tooth to a similar part of an adjacent tooth and by reason of the teeth 33 being on a helical surface, each of the teeth is accordingly axially removed ⅛ of a tooth pitch from its adjacent teeth.

If desired the pitches may be whole number multiples of each other, such as, for example, the pitch of the stator teeth and the pitch of the rotor teeth being in the ratio of 1 to 2, in which instance the axial distance between the teeth would then be ¼ of a tooth pitch. Moreover, while eight poles have been shown, a different number may be employed if desired.

The axial length of the laminations 20 is made to be dependent on the linear distance that the rotor moves plus the length of the rotor. Thus there are enough laminations 20 to form poles having sufficient length to circumscribe both members in all their positions throughout the extent of linear movement of the rotor.

In order to accommodate the difference in polarity of magnetization between the members 28 and 29, the member 29 is axially spaced from the member 28 a distance equal to a whole number times the tooth pitch of the rotor teeth 33 and 33' plus ½ of a tooth pitch. With this construction, if a tooth 33 is exactly aligned with a tooth 26 of the stator then a corresponding tooth 33' of the member 29 is exactly out of line with the stator teeth opposite thereto. Accordingly, if one of the teeth 33 is opposite a pole magnetized as an S pole, then there is an attraction therebetween while there is a repulsion in the same direction between a corresponding tooth 33' of the member 29 and the teeth of the same pole. The tooth 33 will attempt to become as nearly aligned as possible with its opposing pole tooth while the tooth 33' becomes as far from alignment as possible with its opposing stator teeth. Thus both members provide a force which acts in the same direction with respect to the stator.

Shown in FIG. 4 is a schematic diagram of the windings 23a through 23h and a manner of their interconnection to a source of direct current 34. The windings are connected to form four phases with each of the phases having two oppositely wound windings. Each pair of windings in connected through a reversing switch 35a, 35b, 35c and 35d to the source 34 so that each phase may have the direction of current therethrough reversed and thus change the magnetic polarity of the poles associated with the windings.

Referring specifically to the phase connected to the switch 35a, this phase includes, as shown, the windings 23a and 23e. When the switch 35a is in the solid line position shown, current flows through these two windings in the direction which enables the winding 23a to render its associated pole 21a an N pole while the winding 23e is wound in the opposite direction such that it renders its associated pole 21e an S pole. Movement of the switch 35a to its other position will reverse these polarities and the pole 21a then becomes an S pole and the pole 21e becomes an N pole. The other phases are similar in construction with the phase connected to the switch 35b including the windings 23b and 23f; the phase connected to the switch 35c including the windings 23c and 23g and the phase connected to the switch 35d including the windings 23d and 23h. In each of the solid line positions of the switch, the poles 21b, 21c and 21d are N poles while the poles 21f, 21g, 21h are S poles while the other position of each switch reverses these polarities.

FIG. 5 consists of a chart of the polarities required by each of the poles in order to effect movement of the rotor. As the rotor moves ⅛ of a tooth pitch for each change in energization of the stator, the sequence of changes required repeats after eight steps. For the position denoted Step I, the poles 21a through 21d are N poles while the poles 21e through 21h are S poles. With the stator accordingly magnetized as shown in Step I, the poles 21a through 21d will try to have the opposite teeth of the member 29 aligned therewith and the teeth of the member 28 misaligned. This is shown pictorially in FIG. 3a wherein as the poles 21a through 21d are N and the member 28 is N, the center of repulsion therebetween accordingly lies at a point 37. The center of attraction between the poles 21e through 21h for the four teeth of the member 28 opposite said poles lies at a point 38. The point 37 is only a theoretical point and on the motor, would be positioned in the slot between the windings 21b and 21c while the point 38 is also a theoretical point and would be located in the slot between the windings 21f and 21g. Thus, the points are diametrically opposite each other.

The next sequence of energization shown in the chart, FIG. 5, after Step I is Step II and is achieved by shifting only the switch 35a to its other than solid position without changing the position of the other switches. The pole 21a then becomes an S pole while the pole 21e becomes an N pole with the other poles maintaining the same magnetization in Step II as they had in Step I.

Referring to FIG. 3b, the corresponding point 37 will shift to the position of the point 37a while the corresponding point 38 will occur at the point 38a, namely between the poles 21c and 21d and the poles 21g and 21h respectively. The point 38a, as can be seen when the point 38 is included in FIG. 3b and indicated by the reference numeral 38' is rightward of the point 38'. A reference line 39 that interconnects the points 37a and 38a is shown for comparison purposes and it portrays the angle that the rotor teeth make with the stator teeth, this angle being the pitch angle for the teeth of the rotor. Thus the shift of the energization of the windings from Step I to Step II causes a linear movement of the rotor to be a distance which is equal to ⅛ of the tooth pitch of the teeth. Subsequent energizations of the windings in the sequence indicated in FIG. 5 will each cause ⅛ of a tooth pitch movement rightwardly of the rotor until after eight changes have been effected when the sequence is repeated and the parts will assume the relative positions shown in FIG. 3a.

As shown in the drawing, the arcuate length of the teeth of both the stator and rotor are substantially equal and hence it has been found that inherently the rotor resists rotational movement as the teeth tend to maintain their linear alignment or misalignment.

It has been found in one embodiment of the invention that the tooth pitch may be .108 inch with the maximum width of the crest portion of the tooth being .046 inch and the remainder, the recessed portion of each tooth pitch, being .062 inch. One manner of fabricating the stator may be by utilization of two thicknesses of the lamination 20 with each thickness being .023 inch and three thicknesses of the laminations 20', with each thickness being slightly less than .021 inch. The laminations 20 would be formed to have the raised portion of the tooth and the laminations 20' formed to have the recessed portion. The employment of teeth in which the width of the crest is less than the width of the depression provides directional stability to assure that the rotor linearly moves in the direction by which the windings are energized. Thus as shown in the chart when the windings are energized in the normal sequence, I, II, III, IV, etc., the rotor moves rightwardly while if energized reversely VIII, VII, VI, V, etc., the rotor moves leftwardly. The movement for each step irrespective of its direction however remains substantially constant.

It will accordingly be appreciated that there has been disclosed an electric motor that produces reciprocating linear motion for each change in energization of its stator windings with each change linearly moving the rotor an incremental distance. The motor has been found capable of exerting a relatively large force and yet have the incremental distance be relatively small. This is achieved primarily by the stator and the rotor having teeth with the teeth of one being annular to the axis of movement while the teeth of the other are on a helix having a coinciding axis. Thus each change moves the rotor only a small fractional part of the tooth pitch.

Variations and modifications may be made within the scope of the claims and portions of the improvements may be used without others.

I claim:

1. A reciprocating electric motor for providing incremental linear movement comprising a stator member formed to provide a plurality of inwardly directed poles, the inner surfaces of said poles lying on a cylindrical surface and being formed with peripheral arcuate teeth and means for magnetizing the poles; a rotor member, means mounting the rotor for linear movement within the stator, said rotor including at least one cylindrical element having peripheral arcuate teeth and means for magnetizing the element; in which the teeth of one member lie on parallel cylindrical surfaces and the teeth of the other member lie on a helical surface with the axial pitch of the teeth of one member being equal to the axial pitch of the helical surface of the other member, there being a plurality of teeth in each axial pitch length of the helical surface of the other member and in which the teeth in each axial pitch are axially displaced a constant distance.

2. The invention as defined in claim 1 in which there are as many teeth in each axial pitch as there are poles in the stator.

3. A reciprocating electric motor for providing incremental linear movement comprising a stator member formed to provide a plurality of inwardly directed poles, the inner surfaces of said poles lying on a cylindrical surface and being formed with peripheral arcuate teeth and means for magnetizing the poles; a rotor member, means mounting the rotor for linear movement within the stator, said rotor including at least one cylindrical element having peripheral arcuate teeth and means for magnetizing the element; in which the teeth of one member lie on parallel cylindrical surfaces and the teeth of the other member lie on a helical surface, in which the means for magnetizing the stator includes a winding for each pole with the windings being adapted to be connected to a source of electrical energy and in which the rotor includes a shaft and the means for magnetizing the rotor element includes a permanent magnet carried by the shaft.

4. The invention as defined in claim 3 in which there are eight poles, and eight windings, means connecting the windings of diametrically opposite poles in series and inductively inversely to form four phases and means for changing the energization of each phase to change the magnetic polarity of the poles associated with the windings.

References Cited

UNITED STATES PATENTS

| 3,292,065 | 12/1966 | Fredrickson | 318—135 |
| 3,135,880 | 6/1964 | Olson et al. | 310—14 |
| 3,162,796 | 12/1964 | Schreiber et al. | 318—135 |
| 2,848,632 | 8/1958 | Keene | 310—27 |
| 2,915,654 | 12/1959 | Robinson | 310—14 |
| 3,268,747 | 8/1966 | Snowdon | 310—13 |
| 3,265,911 | 8/1966 | Madsen | 310—12 |

FOREIGN PATENTS 842,376   7/1960   Great Britain.

OTHER REFERENCES

I.B.M. Technical Disclosure Bulletin, vol. 6, No. 9, February 1964, Linear Incremental Motor, L. J. Thompson.

MILTON O. HIRSHFIELD, *Primary Examiner.*

B. A. REYNOLDS, *Assistant Examiner.*

U.S. Cl. X.R.

310—15, 49